UNITED STATES PATENT OFFICE.

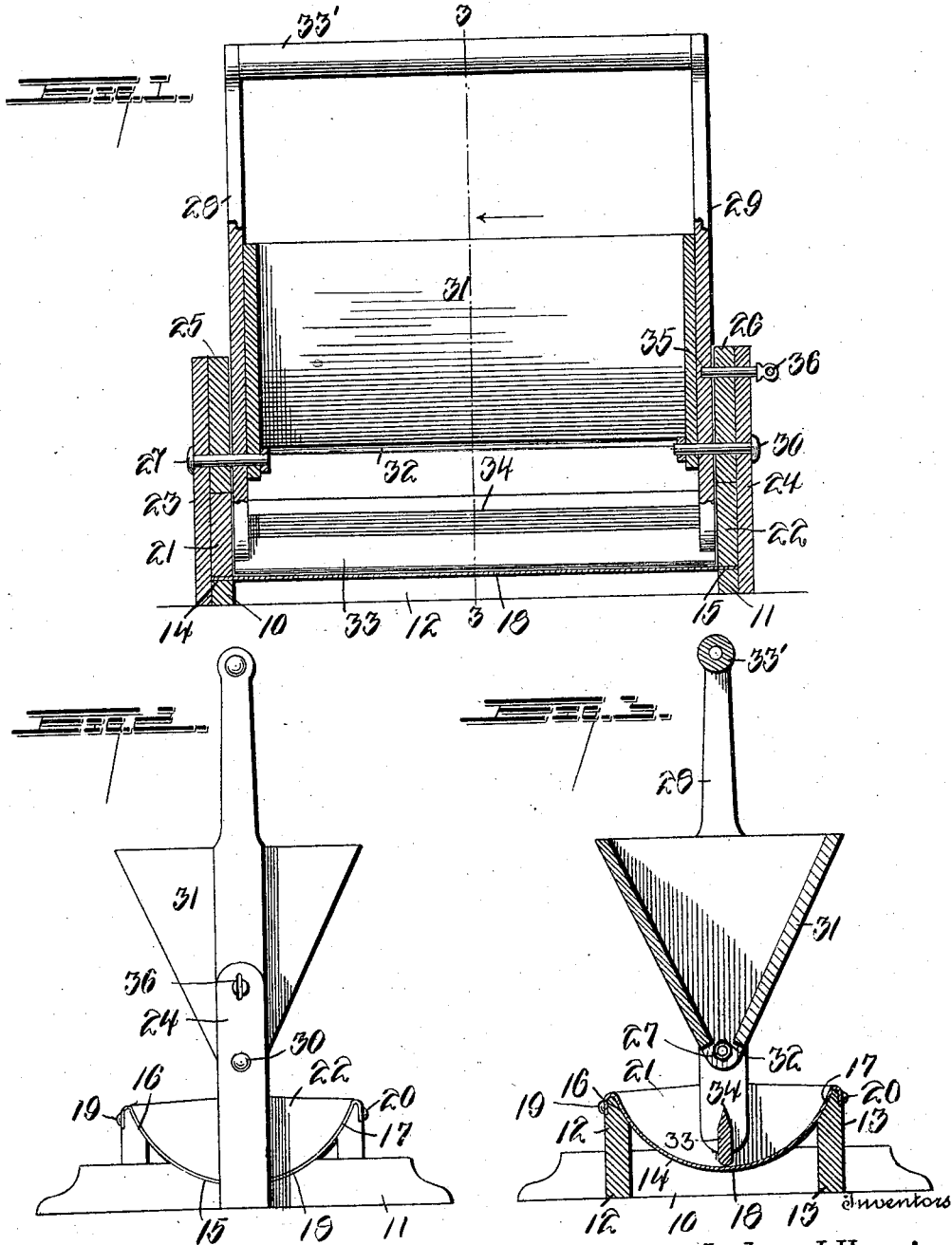

ANDREW J. HARRIS AND CHARLES HARRIS, OF STURGEON, MISSOURI.

STOCK-FEEDER.

966,686.  Specification of Letters Patent.  Patented Aug. 9, 1910.

Application filed February 1, 1910. Serial No. 541,343.

*To all whom it may concern:*

Be it known that we, ANDREW J. HARRIS and CHARLES HARRIS, citizens of the United States, residing at Sturgeon, in the county of Boone, State of Missouri, have invented certain new and useful Improvements in Stock - Feeders; and we do hereby declare the following to be a full, clear, and exact description of the invention, such as will enable others skilled in the art to which it appertains to make and use the same.

This invention relates to stock feeders.

The object of the invention resides in the construction of a feeder of the character named which will enable same to be thoroughly and effectively cleansed without the use of a shovel or the entrance of the attendant into the inclosure in which the stock is confined.

A further object of the invention resides in the construction of a stock feeder which will be simple in construction, effective in use and comparatively inexpensive to install and maintain.

With the above and other objects in view the invention consists in the details of construction and in the arrangement and combination of parts to be hereinafter more fully described and particularly pointed out in the claims.

In describing the invention in detail reference will be had to the accompanying drawings wherein like characters of reference denote corresponding parts in the several views, and in which, Figure 1 is a longitudinal section of a stock feeder constructed in accordance with the invention; Fig. 2, an end view of the feeder; Fig. 3, a section on the line 3—3 of Fig. 1.

Referring to the drawings, the feeder is shown as comprising a base portion formed of the end members 10 and 11 and the side members 12 and 13. The end members 10 and 11 have their upper edges provided with corresponding concave recesses 14 and 15 respectively, while the side members 12 and 13 have their inner faces curved outwardly at their tops as at 16 and 17 respectively; the curved portions 16 and 17 constituting a continuation of the arc formed by the recesses 14 and 15. Supported in the concaved recesses 14 and 15 is a trough 18, the sides of which are disposed, at their upper ends against the curved faces 16 and 17 of the side members 12 and 13; said sides being continued beyond said curved faces and bent downwardly against the outer faces of the side members 16 and 17 and secured thereto by the bolts 19 and 20 respectively. The ends of the trough 18 are closed by the semi-circular end members 21 and 22. Mounted on the outer faces of the end members 10 and 21 is the upright 23, while a corresponding upright 24 is mounted in the outer face of the end members 11 and 22. Disposed above the end member 21 and against the inner face of the upright 23 is a block 25, while a corresponding block 26 is disposed above the end member 22 and against the inner face of the upright 24. A bolt 27 passes through the upright 23 and block 25 and forms a pivot bearing for an arm 28, the lower end of which projects inwardly of the trough 18. A corresponding arm 29 is pivotally mounted on a bolt 30 which projects through the upright 24 and the block 26; the lower end of said arm 29 also projecting inwardly of the trough 18. Fixed between the arms 28 and 29 in any suitable manner is a hopper 31 provided with a discharge mouth 32 and the upper end of said arms 28 and 29 are connected by a handle bar 33' to permit the manual oscillation of said arms on their pivot as will be presently described. The lower end of the arms 28 and 29 are connected by a hoe member 33 which is disposed directly beneath the central portion of the discharge mouth 32 of the hopper and extends beneath the lower extremities of the arms 28 and 29 to a point almost in contact with the trough 18. The upper edge of the hoe member 33 is beveled to a point as at 34 for a purpose to be presently described.

It will be noted that the transverse curvature of the trough 18 is the arc of a circle whose center lies in the common longitudinal axis of the pivot bolts 27 and 30 so that when the arms 28 and 29 are oscillated on their pivots the lower end of the hoe member 33 will move over the inner surface of the trough in close proximity thereto so that any food contained in the trough will be engaged by the hoe member and carried thereby to be finally expelled over the sides of the trough.

In order to hold the arms 28 and 29 and the trough 31 in vertical position as shown in Fig. 2, the arm 29 is provided with a recess 35 in alinement with apertures formed transversely in the upright 24 and the block 26. A locking pin 36 is then inserted through said apertures so that its inner end will project in the recess 35 and thereby lock the arms 28 and 29 and hopper 31 against oscillation. It will also be apparent that when food is disposed in the trough through the hopper 31 the sharpened edge 34 of the hoe member will serve to direct an equal amount of food in the portions of the trough disposed on each side of said member and when the feeder constitutes a division between two inclosures the animals in each inclosure will be fed substantially the same amount of food. It will be further apparent that as the handle bar 33' is disposed a considerable distance above the trough same may be easily manipulated by the attendant to effect the cleansing of the feeder without entrance into the inclosure in which the animals are confined.

What is claimed is:

1. A stock feeding device consisting of end supports, of a trough disposed therebetween, a frame pivotally mounted between said supports to swing transversely of the trough, a sweep carried by said frame and disposed within said trough, and a hopper carried by said frame having its discharge mouth disposed in alinement with said sweep.

2. A stock feeding device consisting of end supports, a trough disposed therebetween having its upper face concaved transversely, a frame pivotally mounted between said supports adapted to swing transversely of the trough, a sweep carried by said frame and disposed within said trough, the center of the circle which includes the arc formed by the upper face of the trough coinciding with the pivot point of the sweep, and a hopper carried by said frame having its discharge mouth disposed in alinement with said sweep.

3. A stock feeding device comprising end supports, a trough disposed therebetween having its upper face concaved transversely, a frame pivotally mounted between said supports adapted to swing transversely of the trough, a sweep carried by said frame, the side faces of said sweep converging at their upper ends to an edge, and disposed within said trough, the center of the circle which includes the arc formed by the upper face of the trough coinciding with the pivot point of the sweep, and a hopper carried by said frame having its discharge mouth disposed in alinement with said sweep.

In testimony whereof, we affix our signatures, in presence of two witnesses.

ANDREW J. HARRIS.
CHAS. HARRIS.

Witnesses:
MABEL BAKER,
W. H. TODD.